United States Patent
Odegaard et al.

(10) Patent No.: US 12,398,536 B2
(45) Date of Patent: Aug. 26, 2025

(54) SYSTEMS AND METHODS FOR CONTROLLING SKID-STEER POWER MACHINES

(71) Applicant: Doosan Bobcat North America, Inc., West Fargo, ND (US)

(72) Inventors: Justin Odegaard, West Fargo, ND (US); Boston Zachmann, Bismarck, ND (US); Benjamin Althoff, Davenport, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 237 days.

(21) Appl. No.: 18/145,487

(22) Filed: Dec. 22, 2022

(65) Prior Publication Data

US 2023/0193593 A1  Jun. 22, 2023

Related U.S. Application Data

(60) Provisional application No. 63/292,756, filed on Dec. 22, 2021.

(51) Int. Cl.
*E02F 9/20* (2006.01)
*B62D 11/00* (2006.01)
*B62D 11/04* (2006.01)
*E02F 3/34* (2006.01)

(52) U.S. Cl.
CPC .......... *E02F 9/2087* (2013.01); *B62D 11/003* (2013.01); *B62D 11/04* (2013.01); *E02F 9/2004* (2013.01); *E02F 3/3414* (2013.01)

(58) Field of Classification Search
None
See application file for complete search history.

(56) References Cited

U.S. PATENT DOCUMENTS

| | | | |
|---|---|---|---|
| 6,863,144 B2 * | 3/2005 | Brandt | B62D 7/1509 74/471 XY |
| 7,264,068 B2 * | 9/2007 | Priepke | E02F 9/20 180/6.26 |
| 7,784,568 B2 * | 8/2010 | Petersen | B62D 11/003 180/6.7 |
| 7,845,443 B2 * | 12/2010 | Liberty | B62D 61/10 180/24.07 |

(Continued)

FOREIGN PATENT DOCUMENTS

| | | | | |
|---|---|---|---|---|
| CA | 2429609 C | * | 2/2010 | ........... B62D 7/1509 |
| CN | 117500985 A | * | 2/2024 | ................ E02F 3/30 |

(Continued)

OTHER PUBLICATIONS

International Searching Authority, International Search Report and Written Opinion from corresponding PCT Application No. PCT/US2022/082247 mailed May 10, 2023 [16 pgs].

*Primary Examiner* — Kevin R Steckbauer
(74) *Attorney, Agent, or Firm* — Quarles & Brady LLP

(57) ABSTRACT

A power machine can include a control device configured to select a ground-engagement mode from a plurality of ground-engagement modes. An operator input can be received from an operator input device to command movement of one or more drive actuators to provide turning travel. The one or more drive actuators can be commanded to provide modified turning travel based on the selected ground-engagement mode.

25 Claims, 8 Drawing Sheets

(56) References Cited

U.S. PATENT DOCUMENTS

| | | | | |
|---|---|---|---|---|
| 7,942,604 B2* | 5/2011 | Willis | | B62D 7/026 404/85 |
| 8,061,459 B2* | 11/2011 | Oehme | | B60T 11/21 180/6.7 |
| 9,199,825 B2* | 12/2015 | Dueckman | | B66C 13/40 |
| 9,234,582 B2* | 1/2016 | Smith | | F15B 11/17 |
| 9,594,376 B2* | 3/2017 | Larsson | | E21F 13/025 |
| 11,371,215 B2* | 6/2022 | Fukuda | | E02F 9/2083 |
| 11,421,400 B2* | 8/2022 | Lensing | | E02F 9/2203 |
| 11,680,382 B2* | 6/2023 | Cherney | | E02F 9/265 701/49 |
| 12,152,642 B1* | 11/2024 | Graham | | B60K 17/356 |
| 2002/0074179 A1* | 6/2002 | Brandt | | G05G 9/047 180/333 |
| 2002/0074181 A1* | 6/2002 | Brandt | | E02F 3/34 180/332 |
| 2002/0153188 A1* | 10/2002 | Brandt | | E02F 9/2004 180/234 |
| 2009/0038186 A1* | 2/2009 | Osswald | | B62D 49/085 37/468 |
| 2009/0164065 A1* | 6/2009 | Daniels | | B62D 11/003 701/41 |
| 2009/0198414 A1* | 8/2009 | Mohning | | B62D 1/12 280/93.5 |
| 2009/0206589 A1* | 8/2009 | Osswald | | B62D 21/14 187/234 |
| 2010/0021234 A1* | 1/2010 | Willis | | E01C 23/088 417/399 |
| 2014/0041884 A1* | 2/2014 | Zhu | | E02F 3/765 701/50 |
| 2015/0057886 A1* | 2/2015 | Larsson | | B60W 50/14 701/41 |
| 2016/0106031 A1* | 4/2016 | Bejcek | | A01D 34/69 701/70 |
| 2021/0129904 A1* | 5/2021 | Manji | | B62D 11/003 |
| 2021/0316785 A1* | 10/2021 | Ogura | | A01D 34/824 |
| 2022/0289221 A1* | 9/2022 | Velde | | B60W 30/18036 |
| 2022/0356674 A1* | 11/2022 | Norfleet | | G05D 1/0238 |
| 2022/0412050 A1* | 12/2022 | Hoaby | | E02F 9/2012 |
| 2023/0024622 A1* | 1/2023 | Hoaby | | E02F 3/436 |
| 2023/0089256 A1* | 3/2023 | Spears | | B62D 51/02 180/305 |
| 2023/0193593 A1* | 6/2023 | Odegaard | | E02F 9/2004 701/41 |
| 2023/0228058 A1* | 7/2023 | Young | | E02F 9/264 318/434 |
| 2023/0228060 A1* | 7/2023 | Young | | E02F 9/2091 701/50 |
| 2023/0251669 A1* | 8/2023 | Stokosa | | G05D 1/0278 701/25 |
| 2023/0257958 A1* | 8/2023 | Binstock | | B60T 13/686 414/722 |
| 2023/0313490 A1* | 10/2023 | Anderson | | G05D 1/021 172/811 |
| 2023/0323612 A1* | 10/2023 | Keyes | | G05D 1/0214 |
| 2023/0333563 A1* | 10/2023 | Schmidt | | G05D 1/0257 |

FOREIGN PATENT DOCUMENTS

| | | | | |
|---|---|---|---|---|
| EP | 1346269 B1 * | 11/2009 | | B62D 7/1509 |
| JP | 4297826 B2 | 7/2009 | | |
| WO | WO-0246856 A1 * | 6/2002 | | B62D 7/1509 |
| WO | WO-0248817 A1 * | 6/2002 | | E02F 3/34 |
| WO | WO-2023003965 A2 * | 1/2023 | | E02F 3/30 |
| WO | WO-2023122733 A1 * | 6/2023 | | B62D 11/003 |

* cited by examiner

SYSTEMS AND METHODS FOR CONTROLLING SKID-STEER POWER MACHINES

CROSS-REFERENCE TO RELATED APPLICATIONS

This application claims priority to U.S. Provisional Patent Application No. 63/292,756, filed Dec. 22, 2021, the entirety of which is incorporated herein by reference.

BACKGROUND

This disclosure is directed toward power machines. More particularly, this disclosure is directed to power machines that have skid-steer steering (i.e., that can steer by differential rotational speed at opposing sides of the power machine, rather than by steerable wheels or axles).

Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors including compact tractors, and trenchers, to name a few examples. Other types of power machines can include mini-loaders (e.g., mini track loaders), and mowers.

Skid-steer power machines typically have two independently rotatable tractive elements (e.g., endless tracks, wheels, etc.), positioned on opposing sides of the power machine from each other. Movement of these tractive elements not only propel the power machine forward (and in reverse), but also provide steering to turn the power machine. Essentially, the difference in rotational speed of the opposing tractive elements can determine the direction in which the power machine turns, and the radius of the turn.

The discussion above is merely provided for general background information and is not intended to be used as an aid in determining the scope of the claimed subject matter.

SUMMARY OF THE DISCLOSURE

Some embodiments of the disclosure are directed to improvements in the control of skid-steer power machines, including to mitigate undesirable disturbance of the ground that supports these power machines. For example, operator inputs that command turning of skid-steer power machines can be modified to limit overly sharp turns that can undesirably disturb (e.g., damage) delicate ground, such as, for example, turf or lawns.

According to some aspects of the disclosure, a power machine can include a main frame, and drive actuators including a first drive actuator and a second drive actuator. The first and second drive actuators can be configured to actuate independently of each other to provide skid-steer steering. The power machine can include an operator input device configured to receive operator inputs to control movement of the drive actuators, and a control device in communication with the drive actuators and the operator input device. The control device can be configured to select a ground-engagement mode from a plurality of ground-engagement modes, each of the plurality of ground-engagement modes can define a respective turn profile for the power machine, receive, from the operator input device, an operator input corresponding to an operator command for movement of one or more of the drive actuators to provide travel with an operator-commanded movement, determine a drive command to control movement of at least one of the drive actuators based on the selected ground-engagement mode and the operator input, and provide the drive command according to the selected ground-engagement mode to move the at least one of the drive actuators.

In some examples, the determined (e.g., modified) drive command can command no movement of at least one of the actuators for which movement is commanded by the operator input.

In some examples, determining the drive command can include determining a modified drive command for the at least or more drive actuators based on an operator-commanded turn radius being smaller than a minimum allowable turn radius of the selected ground-engagement mode.

In some examples, the control device can be configured to provide the drive command as a modified drive command, including by: modifying the operator input to generate a modified operator input; and transmitting the modified operator input to command movement of the one or more drive actuators according to the modified operator input.

In some examples, the control device can be configured to modify the operator input to: for a first ground-engagement mode, command the movement of at least one of the drive actuators to restrict the rotational capability of the power machine to a first threshold; and for a second ground-engagement mode, command the movement of the at least one of the drive actuators to restrict the rotational capability of the power machine to a second threshold, that is less restrictive than the first threshold.

In some examples, the control device can be configured to modify the operator input to: for a third ground-engagement mode, command the movement of the at least one of the drive actuators to restrict the rotational capability of the power machine to a third threshold, that is less restrictive than the second threshold.

In some examples, the operator input can command movement of the first and second drive actuators with an operator-commanded speed differential. The provided drive command can command movement of the first and second drive actuators with a speed differential smaller than the operator-commanded speed differential.

In some examples, the operator input can command counter-rotational movement of the first and second drive actuators. The provided drive command can command movement of the first drive actuator and the second drive actuator in the same rotational direction.

In some examples, the power machine can include a lift arm coupled to the main frame, and a work element supported by the lift arm.

In some examples, the control device can be further configured to: determine, based on the selected ground-engagement mode, whether to modify the operator command to determine the drive command; and based on the control device determining to modify the operator command, modifying the operator command based on the selected ground-engagement mode, to determine the drive command.

In some examples, for a given operator command, operating under a first ground-engagement mode can result in a first modification of the operator command to determine the drive command and operating under a second ground-engagement mode can result in a second modification of the operator command different from the first modification.

In some examples, the first modification can include zero modification for at least one non-zero operator command.

According to some aspects of the disclosure, a method of controlling a power machine can be provided. The method can include selecting, using an electronic control device, a ground-engagement mode for a power machine that includes a main frame, drive actuators including a first drive actuator and a second drive actuator, and an operator input device. The method can include receiving, from the operator input device at the electronic control device, an operator input that indicates a drive command for movement of one or more of the drive actuators, to provide travel with an operator-commanded turn radius, and modifying the drive command to the one or more drive actuators according to the selected ground-engagement mode to command the drive actuators for travel with a turn radius that is different from or the same as the operator-commanded turn radius.

In some examples, the turn radius can be larger than the operator-commanded turn radius.

In some examples, the drive command can include a commanded rotational travel component and a commanded linear travel component, and modifying the drive command can include determining a modified rotational travel component that is scaled relative to the commanded rotational travel component based on a magnitude of the commanded linear travel component.

In some examples, the operator input device can be movable within an area that can include a restricted region. The modified drive command can be determined based on the operator input corresponding to the operator input device being positioned within the restricted region.

In some examples, the operator input can command non-zero movement of the one or more drive actuators. The modified drive command can correspond to the operator input causes zero movement of the one or more drive actuators. The restricted region can include a sector that extends laterally from a neutral position of the operator input device.

In some examples, the modified drive command can include a zero-movement command for at least one of the one or more drive actuators that is commanded to move by the operator input.

In some examples, the operator input can command travel with an operator-commanded turn radius and an operator-commanded acceleration. The modified drive command can command travel of the power machine with the operator-commanded turn radius and a reduced acceleration relative to the operator-commanded acceleration.

In some examples, the operator input can be an H-pattern input. Determining the modified drive command can include converting the H-pattern input to linear and rotational travel components of an ISO-pattern command and modifying the rotational and travel components of the ISO-pattern command.

In some examples, in a first ground-engagement mode, for any operator input of a set of possible operator inputs at an input device, the modified drive command can command movement of a first drive actuator and a second drive actuator only so that one or more of: the first and second drive actuators rotate in the same direction; or the first and second drive actuators do not rotate.

In some examples, the power machine can include a lift arm coupled to the main frame, and a work element supported by the lift arm.

According to some aspects of the disclosure, a power machine can include a main frame, and drive actuators including a first drive actuator and a second drive actuator. The first and second drive actuators can be configured to provide skid-steer drive for the power machine. The power machine can include an operator input device configured to be positioned within a plurality of available movement regions to control movement of the drive actuators, the movement regions including a restricted region. The power machine can include a control device in communication with the drive actuators and the operator input device. The control device can be configured to select a ground-engagement mode from a plurality of ground-engagement modes, each of the plurality of ground-engagement modes defining respective turning parameter for the power machine, based on movement of the operator input device, receive an operator input that commands an operator-commanded movement of one or more of the drive actuators for operator-commanded turning travel of the power machine, and when the operator input corresponds to the operator input device being positioned within the restricted region, command a modified movement of the one or more drive actuators to provide modified turning travel of the power machine that is different than the operator-commanded turning travel. The power machine of claim 23, wherein the operator-commanded turning travel corresponds to non-zero rotation of at least one of the drive actuators; and In some example, the control device can be further configured to: when the operator input corresponds to the operator input device being positioned within the restricted region, command zero rotation of the at least one drive actuator.

In some example, a lift arm can be coupled to the main frame, and a work element can be supported by the lift arm.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

BRIEF DESCRIPTION OF THE DRAWINGS

The following drawings are provided to help illustrate various features of non-limiting examples of the disclosure and are not intended to limit the scope of the disclosure or exclude alternative implementations.

DETAILED DESCRIPTION OF THE PRESENT DISCLOSURE

Figure 1:
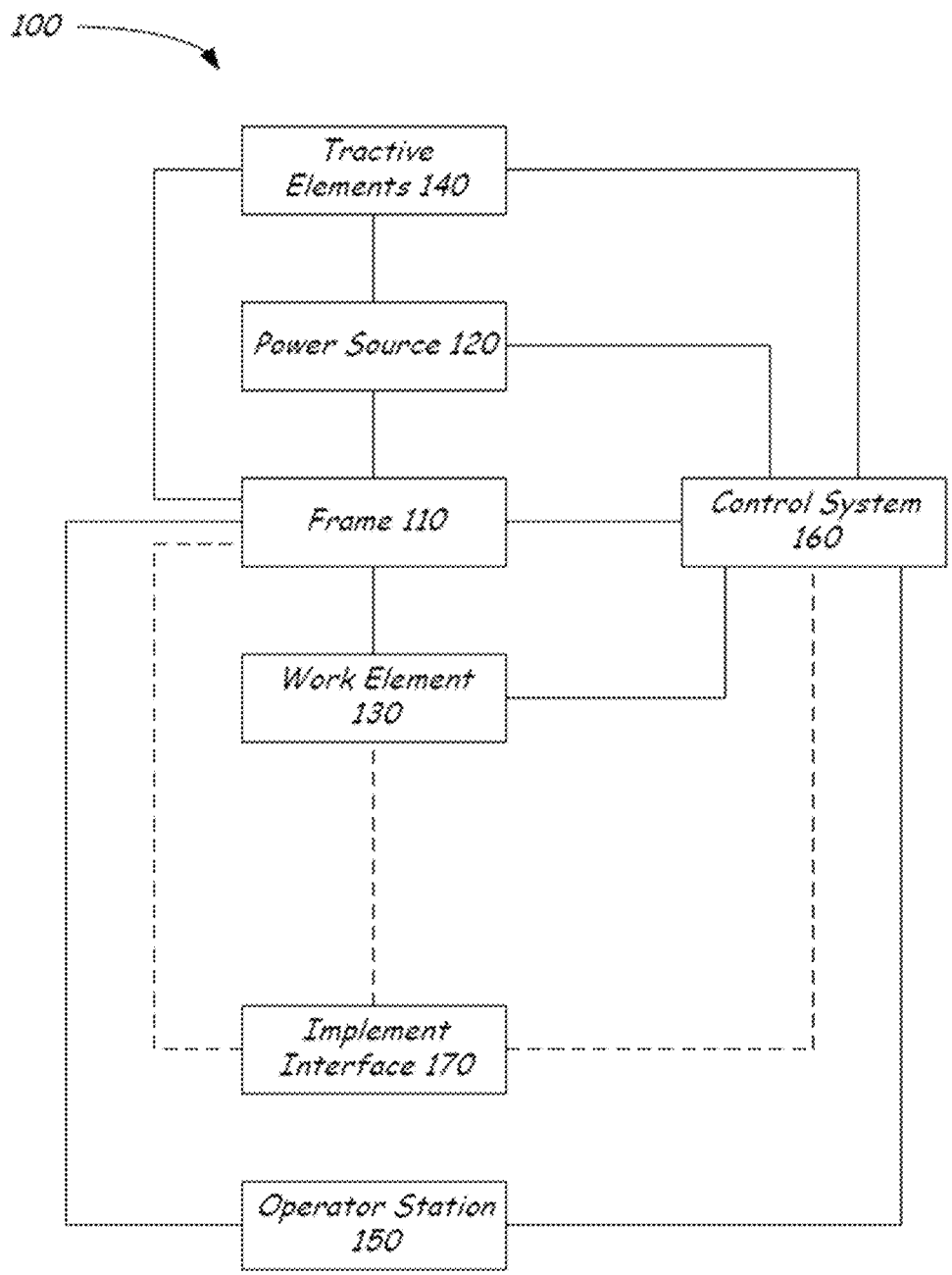
FIG. 1 is a block diagram illustrating functional systems of a representative power machine on which embodiments of the present disclosure can be advantageously practiced.

The concepts disclosed in this discussion are described and illustrated by referring to exemplary embodiments.

These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

As described above, typical skid-steer power machines (including skid-steer loaders) can include at least two tractive elements, which are positioned on opposing sides of the power machine. These tractive elements engage the ground to propel the power machine forward and in reverse, as well as to facilitate steering of the power machine in different directions (e.g., left forward, right forward, left reverse, right reverse, etc.). However, during sharp turns or other turning operations on delicate grounds (e.g., natural turf, artificial turf, etc.), tractive elements can undesirably dig into and rip up the ground. For example, if an implemented turn radius of a power machine is too sharp, the corresponding differential velocity between left and right side drive motors (or other similar actuators) can cause the tractive elements to dig into or otherwise damage softer ground. This can be particularly burdensome for high manicured lawns, turfs, fields, etc., in which the divots (that displaced the ground) must be refilled or other damaged areas replaced.

Some embodiments of this disclosure can address these issues (and others) by providing improved systems and methods for controlling skid-steer power machines. For example, some embodiments of the disclosure provide a control system for a skid-steer power machine that can operate according to different ground-engagement modes, each with different turning parameters (i.e., control properties for turning) that can be used to differently control the way in which the tractive elements of the power machine travel over ground during turning travel. As a more specific example, a property of a ground-engagement mode can be a turn radius (e.g., a minimum permitted turn radius) for the power machine, which can inform control of the drive actuators that respectively move the tractive elements. For example, if an operator input (e.g., received from an operator input device) is indicative of operator-commanded travel with a turn radius that is smaller than the turn radius defined by the ground-engagement mode, then the control system can modify the operator input (or otherwise adjust the actuator command transmitted to the drive actuators) to ensure that the power machine turns at a radius that is not less than the turn radius defined by the ground-engagement mode. In this way, the power machine can avoid sharp turns that could undesirably disturb the delicate ground supporting the power machine, such as, for example, a lawn, a turf, etc.

In other implementations, similar control can be otherwise implemented to effectively increase turn radius during actual travel of a power machine, as compared to a turn radius of travel commanded by a particular operator input. For example, some implementations may not expressly define a minimum (or other) turn radius or compare a commanded turn radius (or other rotational capability of the power machine) to a threshold but may effectively limit an actual minimum turn radius (or other rotational capability of the power machine) during travel as compared to a turn radius (or other rotational capability of the power machine) that corresponds to a received operator input. For example, in some implementations, limiting a minimum turn radius for skid-steer turning may include receiving an operator input that corresponds to a rotational travel component and a forward/reverse linear travel component, and then scaling the rotational travel component based on the selected ground-engagement mode, before actually commanding movement of the relevant actuators. Thus, for example, a power machine can be controlled to turn in response to an operator-commanded turn, but with an effective turn radius that may be less damaging to the ground than if the operator-commanded turn were implemented without modification. As another example, as discussed in further detail below, similar control of turn radius, including without express derivation or evaluation of a turn radius value, can proceed based on predetermined look-up tables (e.g., relating percentage steering changes to magnitude of travel commands), based on geometric mapping of positions of input devices (e.g., preventing or otherwise limiting turning for certain restricted zones within an area of movement for a joystick or other input device), or in various other ways.

Figure 2:
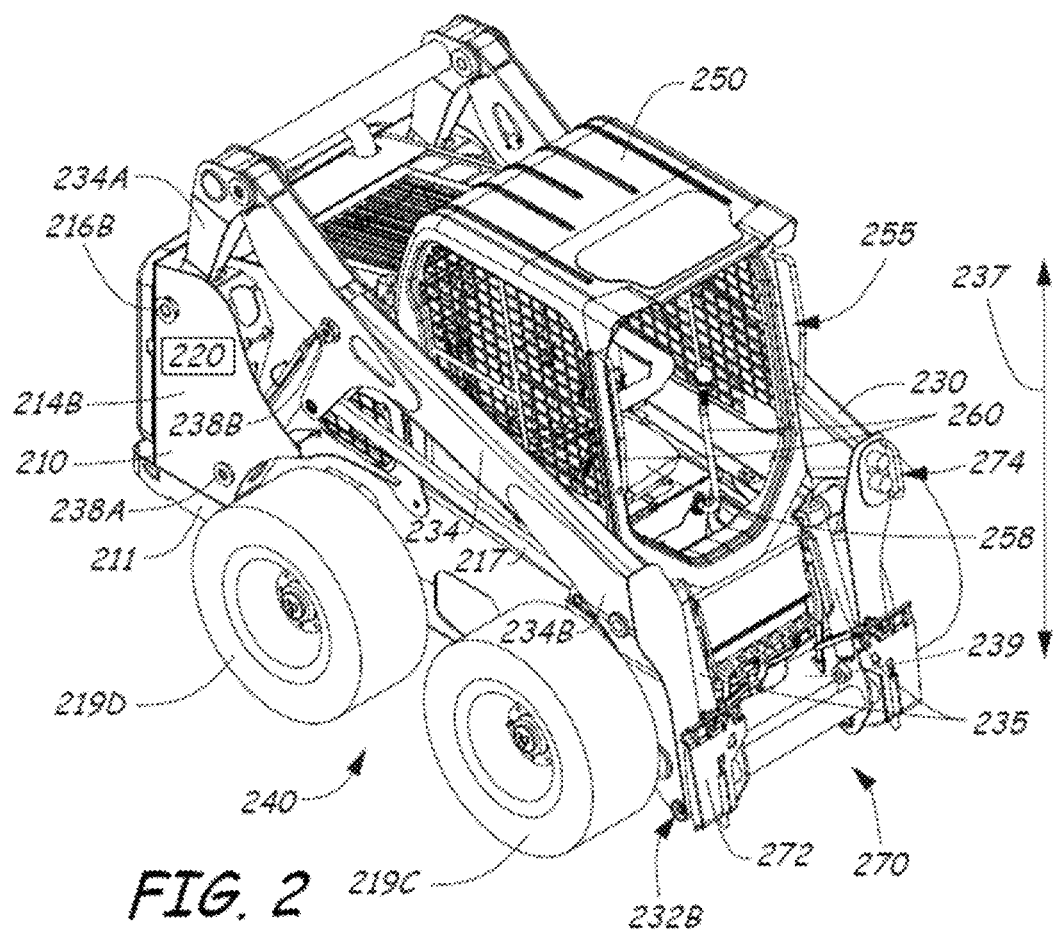
FIGS. 2-3 illustrate perspective views of a representative power machine in the form of a skid-steer loader of the type on which the disclosed embodiments can be practiced.
Figure 3:
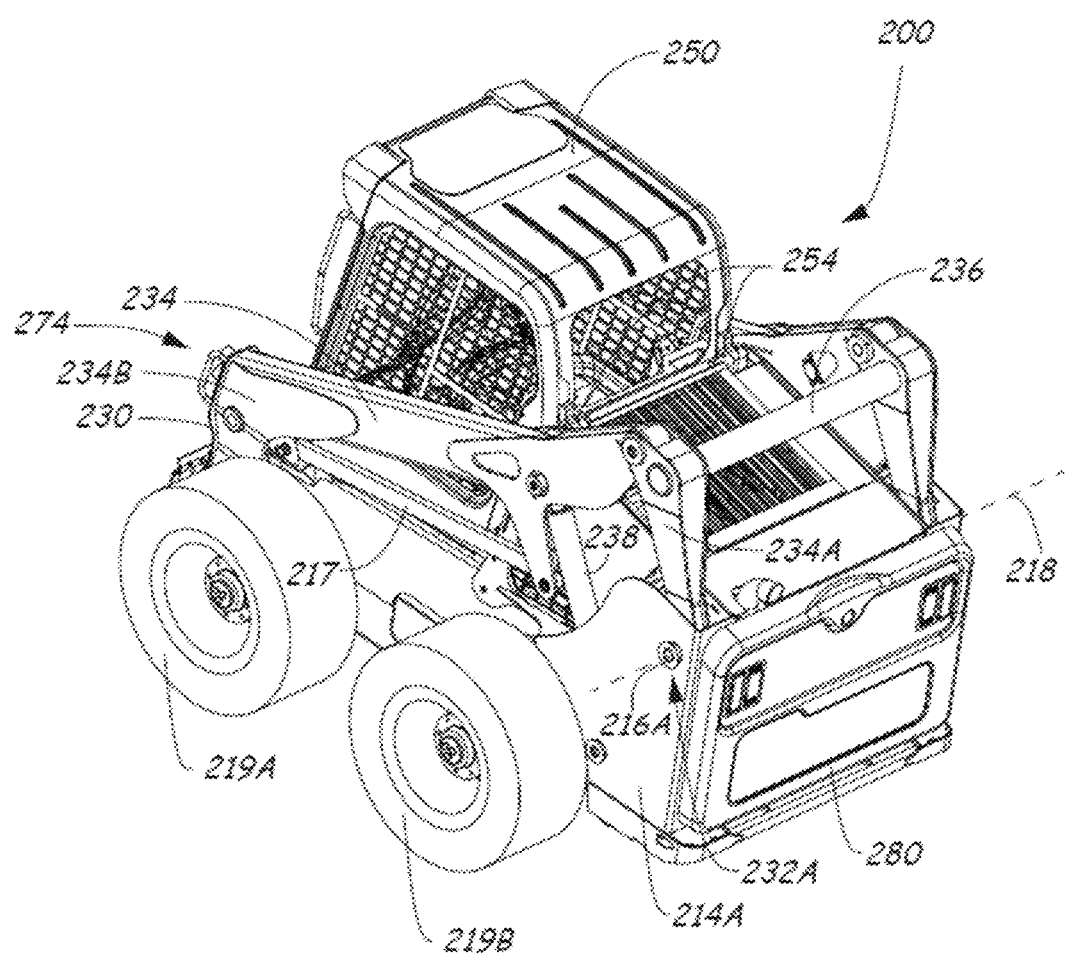

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. Generally, at least one of the work elements is a part of a motive system for moving the power machine under power (e.g., a hydrostatic or electric drive motor).

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. For example, the power machine can be a mower with a mower deck or other mower component as a work element, which may be movable with respect to the frame of the mower. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e., from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e., remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements. Correspondingly, although some example power machines discussed herein are presented as skid-steer power machines, some embodiments disclosed herein can be implemented on a variety of other power machines. For example, some embodiments can be implemented on compact loaders or compact excavators that do not accomplish turns via skidding, including with respect to limiting articulation of an articulatable frame during turning (or other) operations based on one or more characteristics of an operator input (e.g., a commanded linear speed) and one or more operational parameters of a ground-engagement mode (e.g., scaling factors for a rotational component of a command drive movement).

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 200 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e., the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end 232A of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e., along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
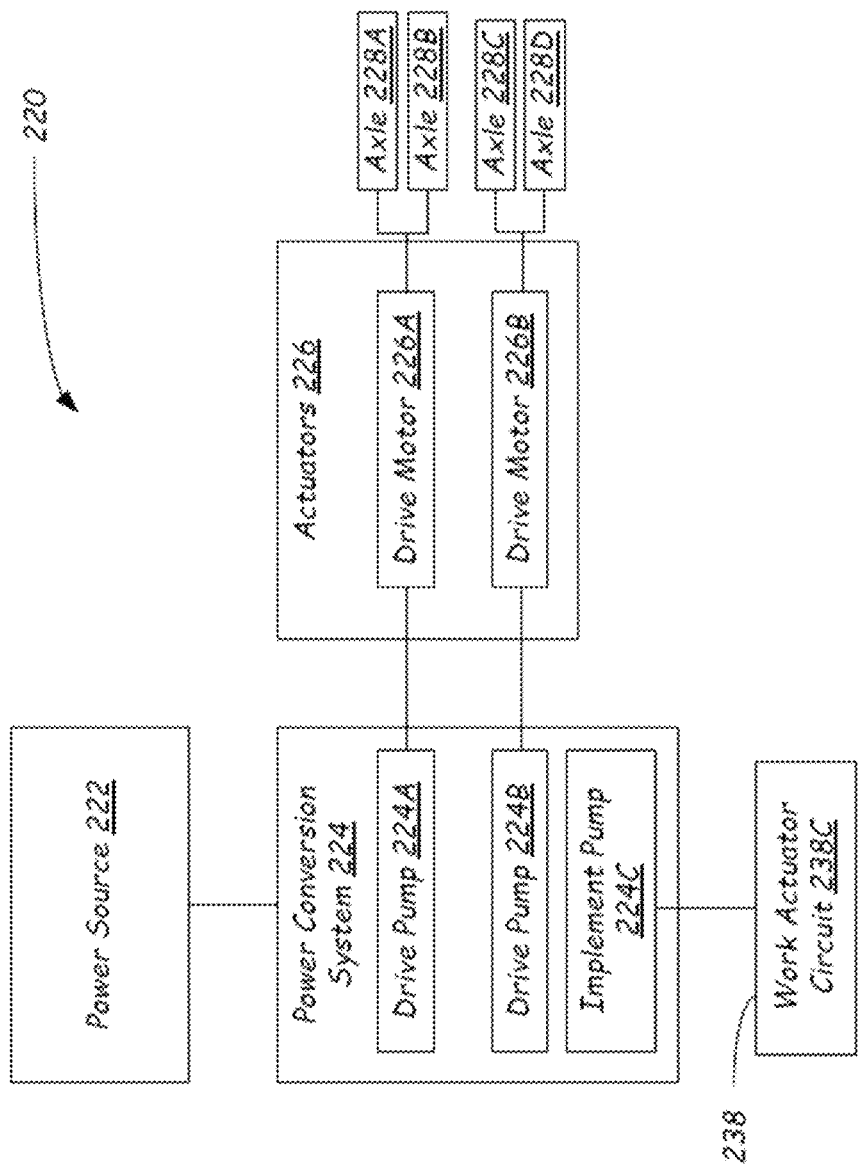
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit 238C also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

As generally noted above, it may be useful to control steering operations to reduce strain on the ground, and associated damage, during turning travel of a power machine. To this end, for example, some power machines according to this disclosure can be configured to control steering, as commanded by various operator inputs, also based on one or more parameters of any one (or more) of a plurality of ground-engagement modes. In some cases, for example, an operator can provide an operator input at an operator input device to command a particular steering operation of a power machine. The operator input can thus result in transmission of an input signal that corresponds to the operator-commanded steering operation, from the operator input device to one or more electronic control devices of a control system of a power machine (e.g., a hub controller, drive controller, interface controller, etc.). Under a first ground-engagement mode, the input signal may result in a first commanded steering operation for the power machine (e.g., a first set of commands for left and right drive motors), which may in some cases be different from the operator-commanded steering operation. For example, the first commanded steering operation may sometimes control the power machine to steer in the same direction as the operator-commanded steering operation, but with a smaller magnitude (i.e., larger turn radius) or a smaller speed (e.g., measured as an average ground speed of the power machine during a turn). Similarly, under a second ground-engagement mode, the input signal may result in a second commanded steering operation, which may modify the operator steering command in different ways (e.g., to have an even larger turn radius or slower speed). Thus, through the selective use of ground-engagement modes, a particular operator input can be selectively modified to provide different actual turning operations, to substantially and advantageously reduce ground damage.

Figure 5:
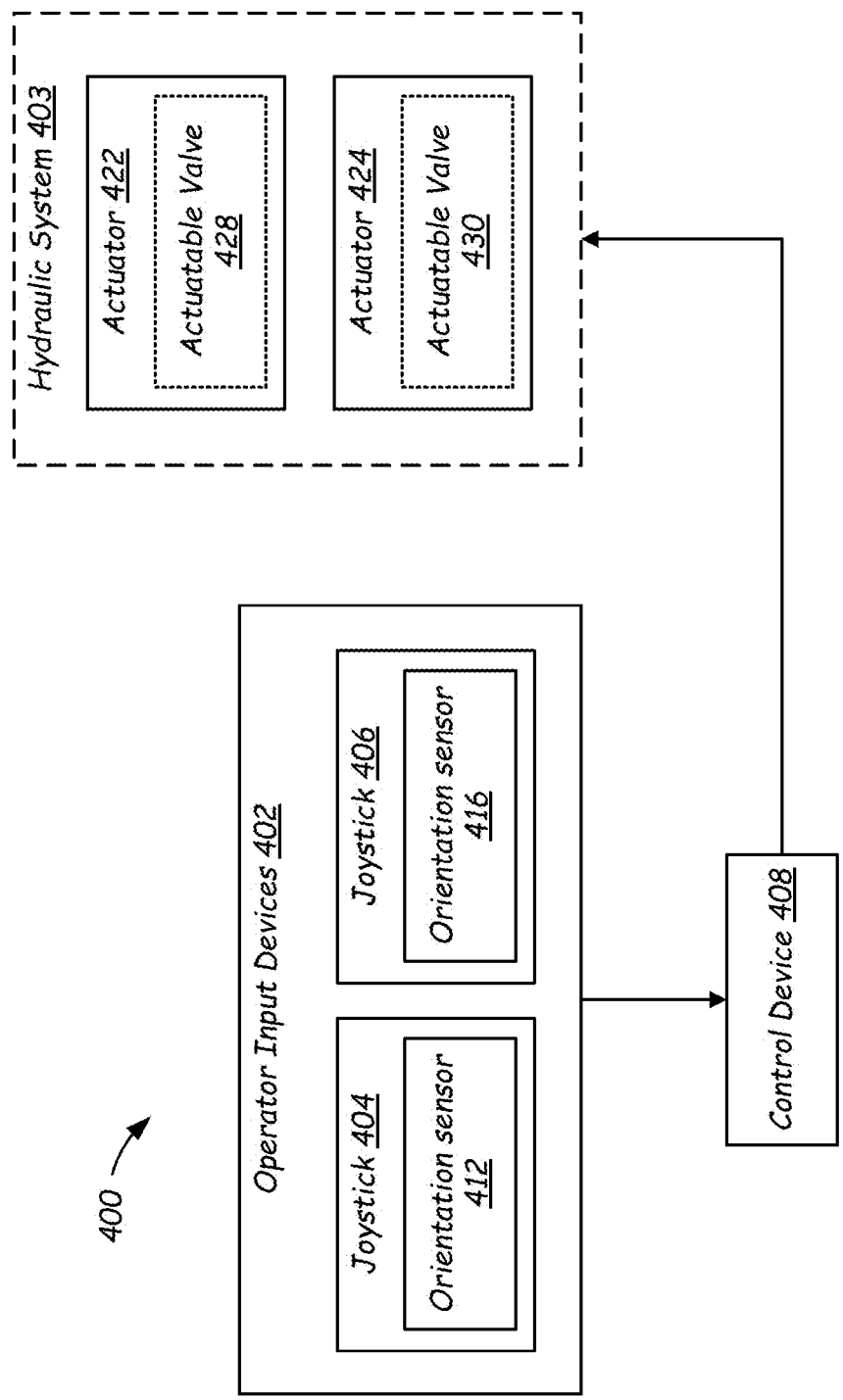
FIG. 5 is a schematic illustration of a control system for a skid-steer power machine, such as a skid-steer loader, for example.

FIG. 5 shows a partial schematic illustration of a control system 400 for a skid-steer power machine such as a skid-steer loader (or other power machine), as can be implemented as a specific example of the control system 160 (see FIG. 1), or a portion thereof. The control system 400 can include one or more operator input devices 402, a hydraulic (or electric, etc.) system 403 to provide powered movement, and a control device 408. The operator input devices 402 can be implemented in different ways, including as one or more joysticks, one or more pedals, or one or more other known types of devices for receiving input from operators for control of components of a power machine (i.e., generally, known types of human-machine interfaces).

In one embodiment, as shown in FIG. 5, the operator input devices 402 can include joysticks 404, 406. Each joystick 404, 406 can be located within a cab of the power machine (e.g., the cab 250 of FIG. 3), for example, and each can be pivoted about at least two axes to adjust a current respective position of the joystick 404, 406. Each joystick 404, 406 can include a respective orientation sensor 412, 416 that can sense the current orientation of each joystick 404, 406 relative to a neutral orientation of the respective joystick 404, 406. For example, the orientation sensor 412 can sense the orientation of the joystick 404 relative to a pivot point and neutral axis of the joystick 404, while the orientation sensor 416 can sense the orientation of the joystick 406 relative to a pivot point and neutral axis of the joystick 406. The orientation sensors 412, 414 can each be in communication with the control device 408 and can each be implemented in a variety of known ways and although each of the orientation sensors 412 and 414 are represented as a single sensor, they may, in some embodiments represent a plurality of sensing elements that together sense the orientation of their respective joystick. Examples of the types of sensors that may be employed in representative joysticks include an accelerometer, a magnetometer (e.g., one or more magnetoresistive or Hall-effect sensors), an inertial measurement unit ("IMU"), etc. Thus, regardless of the configuration, the control device 408 can be configured to receive a signal (e.g., an operator input) from each orientation sensor 412, 414 (or the joysticks 404, 406, generally), to indicate a current orientation of each joystick 404, 406.

As further detailed below, the orientation of the joysticks 404, 406 can generally correspond to operator inputs for particular power machine operations, which can then be converted to commands for actuators by the control device 408. For example, in some embodiments, the spatial orientation of either of the joysticks 404, 406 can correspond to a particular type and magnitude of commanded movement. For example, a region of all possible positions for a two-axis joystick can be segmented into one or more regions (e.g., four quadrant sectors arranged around an origin), and any given position within the region(s) may correspond to a particular task for the power machine. Correspondingly, when the control device receives, from the corresponding orientation sensor, an indication that the joystick is within a particular region, then the control device can implement the task associated with the particular region (e.g., driving forward, turning to the right, reverse turning to the left, etc.). In addition, movement of the joystick towards or away a neutral position of the joystick while the joystick is positioned within the particular region can adjust a magnitude of a property related to the task associated with the particular region. For example, further movement of the joystick away from the neutral position can correspond to a commanded increase in speed of a relevant movement, while further movement of the joystick towards the neutral position can correspond to a commanded decrease in speed (e.g., to increase or decrease driving speed or turn radius).

In some embodiments, operator input devices 402 can include one or more actuatable buttons or other operator input devices that can have one or more corresponding positions. Some of these operator input devices can be integrated into handles for joysticks 404, 406. For example, an actuatable button can be a single pole switch (e.g., a trigger, a rocker switch, etc.) that has two corresponding positions, with a first position indicating the trigger being off, and with a second position indicating the trigger being on. As another example, an actuatable button can be a double pole double throw switch having two actuated positions. As yet another example, an actuatable button can be a push-button having two positions (e.g., on-actuated, and off-not actuated). As another example, an actuatable button can be a double push button. In some cases, an operator input device can include other operator input devices including a roller sensor, a toggle sensor, a joystick, etc., each of which can have more than three positions, including a plurality of intermediate positions. Thus, generally, an operator input device can provide commands for power machine operations via bulk movement of the operator input device (e.g., movement of the joysticks 404, 406) or via actuation of buttons on any of the operator input devices 402 (e.g., movement of switches, push-buttons, rollers, etc.). (As used herein, "button" is intended also to include virtual icons or other virtual interfaces that can receive input similar to mechanical buttons).

In some embodiments, the operator input devices 402 can include a display and one or more actuatable buttons associated with the display. In this way, the control device 408 can receive commands from the one or more actuatable buttons to adjust a graphical user interface ("GUI") that is presented on the display. In other cases, the operator input devices 402 can include a touch-screen display that can present the GUI, and the operator can directly interact with the touch-screen display to interact with the GUI. Similarly, in some cases, an operator input device may itself be a touchscreen or a manipulable graphical joystick or other graphical input device displayed to an operator.

As shown in FIG. 5, the operator input devices 402 are mechanically decoupled from the hydraulic system 403, at least relative to control of the hydraulic system 403. Thus, adjustment of the orientation (or actuation of a mechanical button of an operator input device) of the operator input devices 402 does not directly adjust the operation of the hydraulic system 403 or of the actuators of the hydraulic system 403. Rather, operator inputs are received by the control device 408, modified as appropriate (e.g., translated for execution by a dedicated drive controller), and then transmitted to the hydraulic system 403 to control movement of an actuator (e.g., a drive motor). In this regard, for example, the hydraulic system 403 can include actuators 422, 424, which in some cases may include respective actuatable valves 428, 430 to control operation of the actuators 422, 424. Each of the valves 428, 430, for example, can be in communication with the control device 408 and can be in fluid communication with the respective actuator 422, 424. Thus, the control device 408 can adjust a position of each actuatable valve 428, 430 (e.g., by providing electrical signals to each actuatable valve 428, 430) to control hydraulic flow to the respective actuators 422, 424, and thereby control movement of the actuators 422, 424 (e.g., to extend the actuator, to retract the actuator, to rotate the actuator, etc.). In other embodiments, however, other known devices can be used to control operation of other known actuators, based on signals from the control device 408 that are, in turn, based on signals from the operator input devices 402. In some embodiments, the actuatable valves 428, 430, are control valves that control a spool valve, which in turn provides hydraulic flow to the respective actuators 422, 424.

As generally discussed above, the power machine actuators can be implemented in different ways. Further, while two actuators are shown for illustrative purposes, in various embodiments the total number of actuators may be more (or fewer) than two actuators. Generally, however, skid steer operations are implemented using two separate actuators on opposing sides of a power machine.

Accordingly, for example, the actuator 422 can be a drive actuator on one side of the power machine (e.g., a left side), while the actuator 424 can be a drive actuator on the other side of the power machine (e.g., a right side). In this way, the actuators 422, 424, each implemented as a drive actuator, can be controlled independently of each other to provide a speed differential that causes the power machine to turn.

In some configurations, while only two actuators 422, 424 are illustrated in FIG. 5, the control system 400 can include other numbers of actuators, such as, for example, four actuators. In some cases, four drive actuators can be provided, with one pair of drive actuators positioned on one side of the power machine (e.g., a left side), and with a second pair of drive actuators positioned on an opposing side of the power machine (e.g., a right side). Each drive actuator can power a respective tractive element (e.g., a wheel), and each respective pair of drive actuators can be controlled by the control device 408 to operate at substantially the same speed (i.e., deviating by less than 1.0% or otherwise within the acceptable tolerances of a particular drive control system).

The actuatable valves 428, 430 can also be implemented in different ways. For example, each actuatable valve 428, 430 can be an electrically controlled valve including a solenoid valve, a pilot solenoid valve, etc. In this way, when a control device 408 electrically powers the electrically controlled valve (e.g., according to a command output value), the valve position changes to adjust the flow of hydraulic fluid through the electrically controlled valve thereby adjusting the hydraulic flow to a respective actuator. In other implementations, however, other known valve types or other known mechanisms for control of actuators can be used.

The control device 408 can be implemented in a variety of ways. For example, the control device 408 can be implemented as one or more processor devices of known types (e.g., microcontrollers, field-programmable gate arrays, programmable logic controllers, logic gates, etc.), including as general or special purpose computers. In addition, the control device 408 can also include other computing components, such as memory, inputs, other output devices, etc. (not shown). In this regard, the control device 408 can be configured to implement some or all of the steps of the processes described herein, as appropriate, which can be retrieved from memory. In some embodiments, the control device 408 can include multiple control devices (or modules) that can be integrated into a single component or arranged as multiple separate components. In some embodiments, the control device 408 can be part of a larger control system (e.g., the control system 160 of FIG. 1) and can accordingly include or be in electronic communication with a variety of control modules, including hub controllers, engine controllers, drive controllers, and so on.

As also noted above, while the actuators 422, 424 have been described as being hydraulically driven, the actuators 422, 424 (and others) can be electrically driven (e.g., and not hydraulically driven) in other configurators. For example, the actuators 422, 424 (and others of the power machine) can be electrical actuators that are electrically powered by an electrical power source. In this case, each electrical actuator can include an electrical motor that rotates a component coupled to the electrical motor (e.g., a tractive element such as a wheel), or that drives extension (and retraction) of an extender of the electrical actuator. For example, the electrical actuator can be a linear actuator that includes an electrical motor that drives rotation of a lead screw thereby extending (and retracting) the extender rotatably coupled to the lead screw. Regardless of the configuration, in some cases including those in which each actuator of the power machine is an electrical actuator, the power machine does not include any hydraulically driven actuators.

Figure 6:
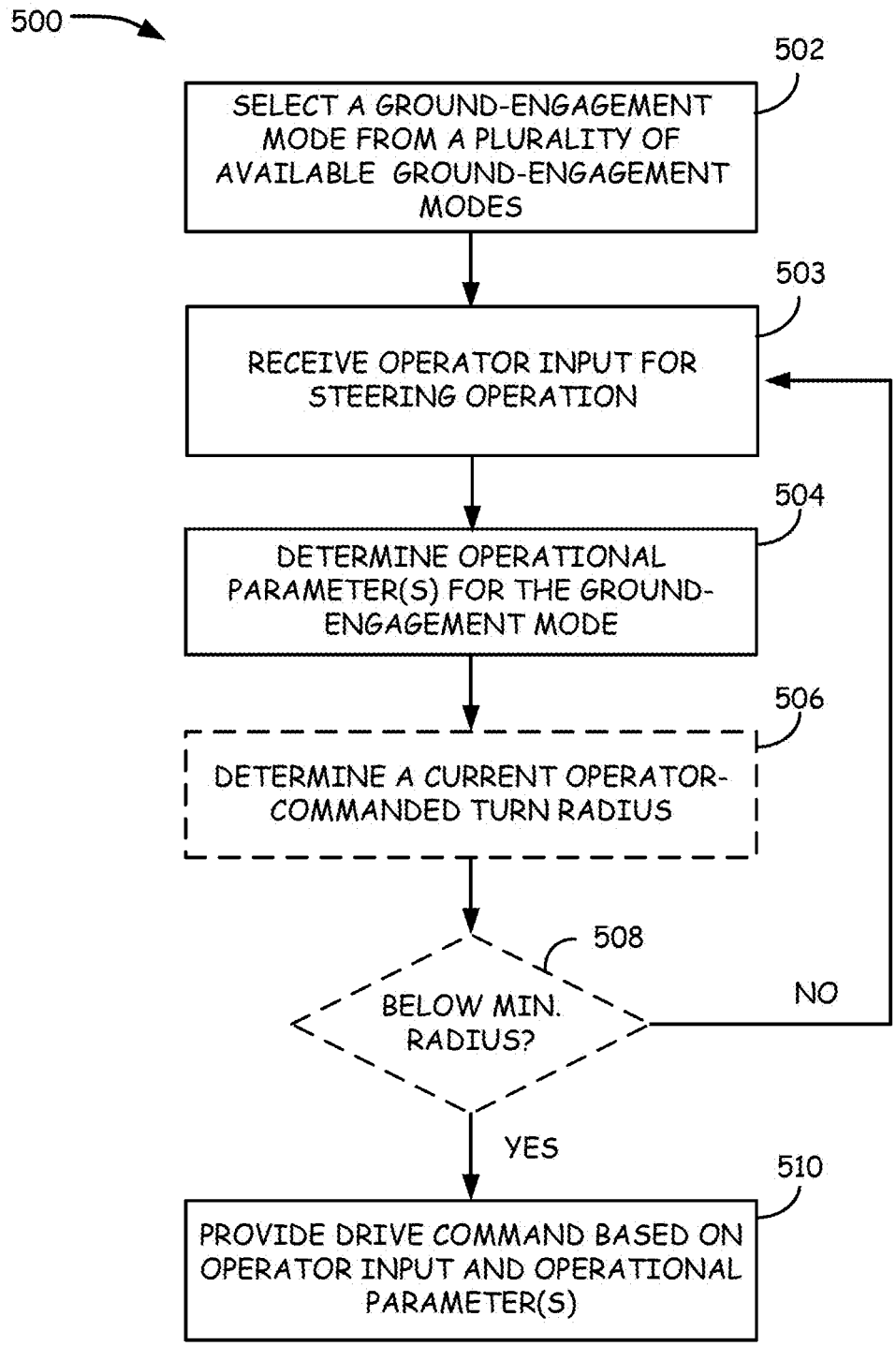
FIG. 6 is a flowchart of a process for operating a skid-steer power machine, which can be implemented using one or more computing devices.

In some embodiments, a control device (e.g., the device 408) can operate to control turning operations of a power machine to ensure (directly or indirectly) that a turn radius or other rotational capability of the power machine does not exceed a particular threshold turn radius or other threshold (e.g., thereby ensuring that the ground supporting the power machine is not undesirably disturbed). In this regard, FIG. 6 shows a flowchart of an example process 500 for operating a skid-steer power machine, which can be implemented using one or more computing devices (e.g., as may form a comprehensive electronic control system for a power machine that includes the control device 408, etc.). In general, the process 500 can be implemented using any of the power machines described herein, as appropriate, or others configured for skid-steering travel and electronic control.

At the block 502, the process 500 can include a computing device selecting a ground-engagement mode from a plurality of available ground-engagement modes. In some cases, selecting a ground-engagement mode can be based on an operator input (e.g., from an operator engaging with a touchscreen or other input device, such as, for example a GUI). In some cases, a computing device can select a ground-engagement mode based on one or more other input parameters, including input parameters that are based on one or more present operational conditions of the power machine. For example, one or more operational conditions upon which selection of a power management mode can be based can include an orientation of the lift arm, an orientation of another work element (e.g., an implement), a commanded movement of the lift arm, a commanded movement of another work element (e.g., an implement), a load supported by a work element, a present power capacity of the electrical power source (e.g., as a percentage of a maximum possible power capacity of the electrical power source), a type of work element supported by the power machine, a type of tractive element currently interfaced with the power machine (e.g., either wheels, endless tracks, etc.), a specific model of a tractive element currently interfaced with the power machine, a specific size of a tractive element currently interfaced with the power machine (e.g., first wheels, or second wheels that are larger than the first wheels, etc.), a type of ground that is (or is to) support the power machine (e.g., a commercial turf, a lawn, a highway ditch area, etc.).

For example, a computing device can determine that endless tracks are currently interfaced with the power machine (e.g., rather than wheels), each of which distribute the weight of the power machine differently over the ground that supports the power machine (as compared to wheels). Based on this determination, the computing device can then select a particular ground-engagement mode (e.g., automatically, or based on presenting an operator with an interface to select from a particular list of modes). In this way, the ground-engagement mode can be specifically tailored to one or more properties of the tractive elements that are currently interfaced with the power machine (e.g., a size of a tractive element, a type of a tractive element, etc.). Accordingly, the power machine is less likely to undesirably disturb the ground supporting the power machine if the particular ground-engagement mode can compensate for the properties of the tractive element currently being used.

As another example, a computing device can determine that a particular work element (e.g., an auger, a mower, a bucket, etc.) is currently interfaced with the power machine, and can select a particular ground-engagement mode based on the particular work element. In this way, the power machine can compensate for different weights of different work elements that could change how the tractive elements interact with the ground. For example, travel with lighter work elements may disturb the ground less than with heavier work elements (e.g., because the greater weight forces the tractive elements to dig into the ground to a greater extent), and thus ground-engagement modes associated with lighter work elements can successfully implement sharper turns without damaging the ground. Correspondingly, one or more ground-engagement modes associated with lighter work elements may sometimes allow for relatively sharp turns.

In some embodiments, there can be different numbers of the plurality of available ground-engagement modes. For example, there can be two, three, four, five, etc., plurality of available ground-engagement modes. In some cases, each ground-engagement mode can have one or more different properties that adjust how the power machine interfaces with the ground supported by the power machine. For example, each ground-engagement mode can include a different maximum allowable turn radius for the power machine. As another example, each ground-engagement mode can include a different amount or way by which an operator input is modified to command movement of one or more drive actuators of the power machine.

In some embodiments, properties of a ground-engagement mode can include a maximum allowable turn radius, one or more amounts by which an operator input is to be modified, etc. In some embodiments, a computing device can be operated to modify one or more properties of a ground-engagement mode (e.g., by an operator interacting with an operator interface). For example, a computing device can modify the minimum allowable turn radius, adjust the scaling of an operator input (or operator command), etc., as may be appropriate for a particular machine, environment, operator, location, etc.

Figure 7:
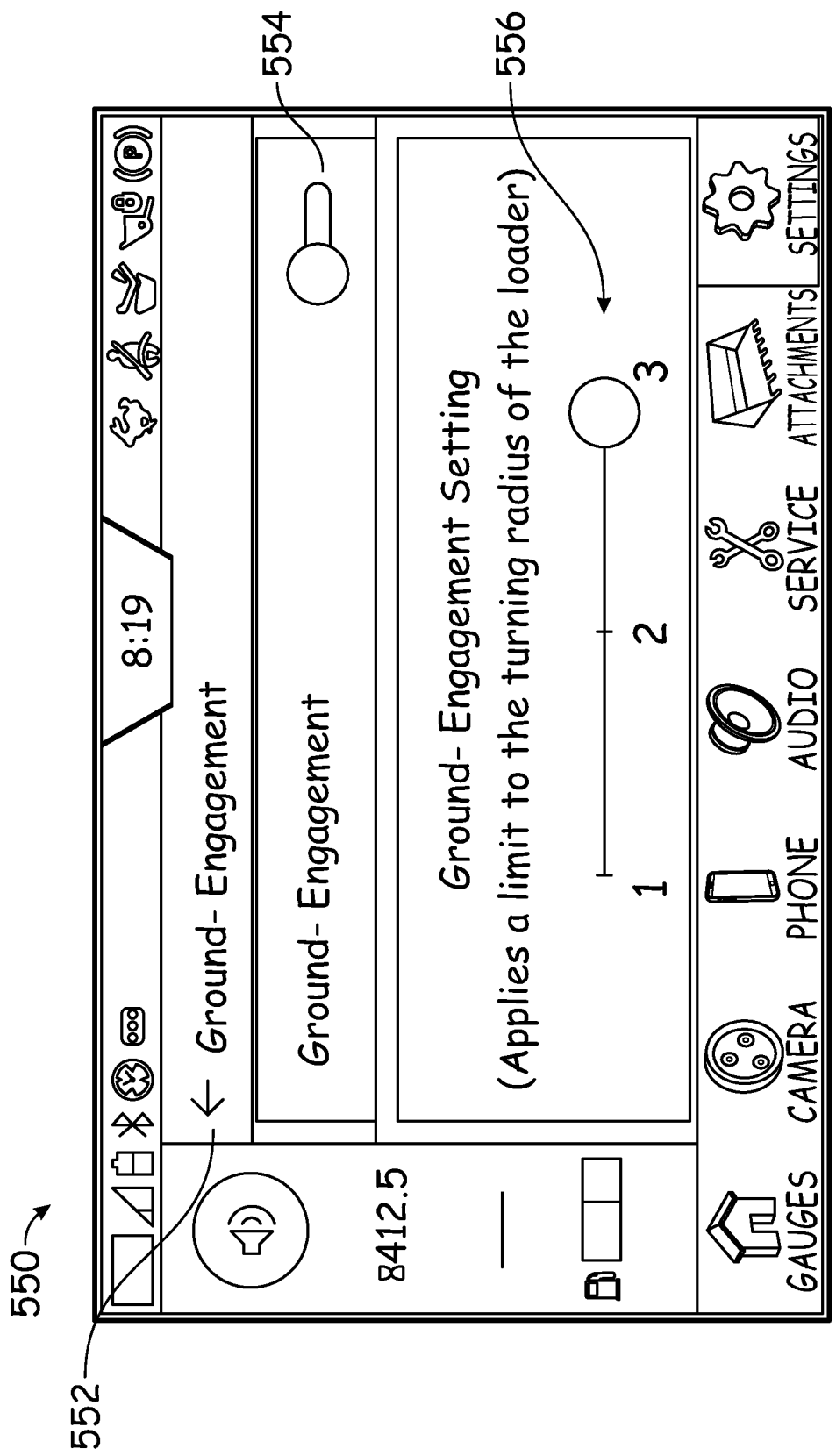
FIG. 7 is a schematic illustration of a graphical user interface, which can be used to select a ground-engagement mode.

As also noted above, selecting a ground-engagement mode at block 502 can sometimes be based on receiving an operator selection or other operator input that indicates a particular ground-engagement mode (or modes). In this regard, for example, FIG. 7 shows a schematic illustration of a GUI 550, which can be used to facilitate selecting the ground-engagement mode at the block 502. For example, the GUI 550 can include an actuatable button 552 (e.g., for selecting the ground-engagement settings from a larger menu), an on/off switch in the form of a toggle 554, and a slide 556. The actuatable button 552, when actuated (e.g., by an operator), presents the ground-engagement settings, which can include the toggle 554 and the slide 556. By engaging with the GUI 550, an operator can turn the ground-engagement on or off using the toggle 554, and can select the specific ground-engagement mode using the slide 556. When ground-engagement has been turned on via the toggle 554, the power machine operates according to a ground-engagement mode, whereas when ground-engagement has been turned off, the power machine does not operate according to any ground-engagement mode (e.g., operates according to default steering control parameters). As shown in FIG. 7, there are three different ground-engagement modes identified at 1, 2, and 3, which can be changed, via movement of the slide 556. For example, including after the toggle 554 has been turned on, an operator can select which of the three ground-engagement modes to force the power machine to operate according to the selected ground-engagement mode. Although three ground-engagement modes are illustrated with respect to the slide 556, other embodiments can include different numbers of modes.

In some embodiments, a computing device can lock the ground-engagement on/off switch to the on position (e.g., using the slide 556) thereby forcing the power machine to operate according to a ground-engagement mode. In this way, a user (e.g., the owner of the power machine) can ensure that the power machine does not undesirably damage the ground (e.g., the turf, lawn, etc.) when an operator is using the power machine. In this regard, a computing device may sometimes only be able to change the position of the on/off switch to off (e.g., unlock the ground-engagement on/off switch) after the computing device receives a valid password. In this way, the operator of the power machine cannot force (or inadvertently change) the power machine out of operating under a ground-engagement mode.

In some embodiments, as also noted above, an operator may be permitted to adjust parameters of one or more steering modes. In some embodiments, a further interface may be included on the GUI 550 to allow a user to adjust steering parameters of the three steering modes selectable by the slide 556 (e.g., to change a percent reduction in steering command for a particular travel speed or magnitude of a drive commend).

Referring back to FIG. 6, at block the 503, the process 500 can include a computing device receiving an operator input for a steering operation. For example, as discussed above, an operator may move a joystick or otherwise engage an input device to provide steering signals to a control system of a power machine.

Generally, a received operator input corresponds to a particular operator-commanded operation (e.g., turning operation) and the relevant control device(s) can command actuators of the power machine to provide an actual operation (e.g., actual turning operation) that matches the operator-commanded operation (e.g., within normal power constraints, etc.) In some embodiments, the operator input can be provided according to an ISO-pattern input (e.g., with a single joystick used to provide an input with a forward/reverse drive component and a rotational travel component based on the orientation of the joystick relative to a neutral position). In some embodiments, the operator input can be provided according to an H-pattern input (e.g., with a left joystick movable relative to one axis to control speed and direction of a left drive motor, and a right joystick movable relative to one axis to control speed and direction of a right drive motor).

In some cases, implementation of the process 500, including as further discussed below, may include a computing device translating between ISO and H patterns. For example, a computing device can receive a pattern input of a first type (e.g., an H-pattern), can decompose this input into a commanded rotational travel component and a commanded drive component, and then can modify these commands appropriately (e.g., as further described below). In some embodiments, the displacement of the left and right H-pattern inputs provide a forward/reverse drive component including a magnitude of the forward/reverse drive component. In addition, the different magnitudes of the left and right H-pattern inputs provides a rotational travel component (e.g., as corresponds to the difference in magnitudes between the inputs). These forward/reverse drive and rotational travel components can then be translated to the ISO pattern. Actual translation between the two patterns can vary based on how the H-Pattern and ISO patterns are defined. For example, various machines can have different response curves so that specific translation between an H-pattern and ISO pattern may vary accordingly. Similarly, a computing device may determine modified steering commands according to separate steering and drive components, then translate the modified steering command into simply a speed and direction of rotation for each of a left and a right drive motor.

At the block 510, the process 500 can include a computing device providing a modified (e.g., reduced or zero) or other drive command to the one or more drive actuators, which drive command can be determined based on the operator input received at block 503 and the ground-engagement mode selected at block 502. For example, this can include a computing device modifying the drive command to the one or more actuators, relative to a command that would otherwise correspond to the operator input, so that at least one of the one or more actuators are commanded to rotate at a slower speed than is indicated by the operator input under default operation. For example, a rotational travel component of an operator command can be reduced by a percentage that is inversely proportional to a magnitude of a drive component of an operator command, so that the power machine will turn with a relatively large modification of steering commands at lower speeds (e.g., to impose a relatively large turn radius) but can turn with relatively little modification of steering commands at higher speeds (at which turns are generally less damaging to the ground).

In some embodiments, providing a modified drive command at the block 510 can include commanding no steering, although the operator input received at the block 502 may correspond to a steered movement. For example, if the operator input corresponds to a position of the operator input device (e.g., joystick) that is within a movement region that is restricted region (e.g., a spatial region of multiple possible positions that the operator input device can be positioned at) of a plurality of available movement regions, then the computing device can provide a modified drive command that may prevent movement of one or more actuators or otherwise provide only for straight forward or reverse travel.

Similarly, in some embodiments, providing a modified drive command at the block 510 can include commanding only travel in which opposing-side actuators of the power machine rotate in the same direction (i.e., so that the actuators are always both at rest, both rotating forward, or both rotating backward). In some embodiments, providing a modified drive command at the block 510 can include commanding travel only with a speed differential that is smaller than a particular threshold difference.

Generally, providing the modified drive command at the block 510 can effectively increase the actual turn radius for the power machine as compared to an operator commanded-turn radius, including by reducing speed differential, preventing counter-rotation, or otherwise control opposing actuators for a skid-steer operation. In different cases, a modified drive command may decrease an actual speed differential relative to the operator-commanded speed differential between a pair of actuators (e.g., drive actuators), decrease the commanded speed to one or more drive actuators compared to an operator-commanded speed, decrease the commanded acceleration to the one or more drive actuators from an operator-commanded acceleration, or implement other control consistent with the discussion herein.

In some cases, as also noted above, providing a modified drive command at the block 510 can include a computing device modifying a drive command by scaling a component of the drive command provided by the operator input. For example, as described above, a computing device can decompose a drive command (e.g., as represented by a command signal from an operator input device) into a commanded rotational travel component (i.e., a commanded turning component), and a commanded drive component (i.e., a commanded forward/backward component). Then, a computing device can determine a modified rotational travel component by scaling the rotational travel component according to the operational parameter(s) of the selected ground-engagement mode from block 504. In some cases, a rotational travel component can be scaled as a function of a magnitude of the commanded drive component (e.g., as discretely represented in a look-up table). For example, a computing device can scale the rotational travel component inversely proportionally, relative to the magnitude of the commanded drive component, so that an operator-commanded rotational travel component is scaled downwards by a larger proportion at lower operator-commanded travel speeds than at higher operator-commanded travel speeds.

In some embodiments, determining (e.g., modifying) a drive command can include applying a scaled value (e.g., a percentage) to the drive command (or the operator input) that can be specific to the particular ground-engagement mode, so that different actual turning operations can be implemented based on the same operator input, depending on the selected ground-engagement mode. For example, each ground-engagement mode can have an associated look-up table with particular scaling values (e.g., percentages) that can be used scale corresponding drive commands.

In some embodiments, scaling values of zero can be provided to correspond to some operator inputs, or certain non-zero operator inputs can be otherwise processed to provide a modified drive command with zero turning. As a more specific example, if the operator input commands a zero-degree turn radius (e.g., the power machine to turn in place), a computing device can modify the operator input in some ground-engagement modes so that the power machine does not turn at all. As another more specific example, if an operator input commands a turn radius that is below a threshold value, then the computing device can provide a modified drive command so that the power machine does not turn at all. As yet another specific example, if the operator input commands a turn radius at a particular drive speed and if the drive speed exceeds a particular threshold, then the computing device can decrease the commanded turn radius (e.g., to a value that is proportional to the particular drive speed).

In some embodiments, each ground-engagement mode can decrease a drive command to a greater degree than other ground-engagement modes. For example, including when there are three different ground-engagement modes, a computing device can modify an operator input differently when the power machine operates in each of the three different ground-engagement modes. For example, when the power machine operates in a first ground-engagement mode and for a first operator input, a computing device can modify the drive command to decrease the commanded turn radius to a first turn radius. As another example, when the power machine operates in a second ground-engagement mode and for the first operator input, a computing device can modify the drive command to decrease the commanded turn radius to a second turn radius that is less than the first turn radius. As yet another example, when the power machine operates in a third ground-engagement mode and for the first operator input, a computing device can modify the drive command to decrease the commanded turn radius to a third turn radius that is less than the second turn radius. In this way, different ground-engagement modes can be more conservative and less conservative for ground disturbance, given the same operator input.

In some embodiments, modifying the drive command (or the operator input) can include the modified drive command, commanding movement of an actuator in a rotational direction that is different than the rotational direction commanded by the drive command (e.g., the unmodified drive command). In this way, for example, a computing device can prevent a pair of actuator from rotating in opposite directions, which can cause the power machine to pivot more than desired thereby tearing up the ground (e.g., turf). Thus, in some cases, providing a modified drive command at block 510 can include a computing device causing a pair of actuators (e.g., a left and right drive actuator) to either rotate in the same direction or not rotate at all, even if the received operator input commands counterrotation or rotation of only one of the actuators. In some cases, this can include a computing device preventing a pair of actuators from rotating in opposing directions, regardless of the received operator input (or any received operator input).

In some implementations, the modified drive commands provided at block 510 to control a turning operation can be determined, expressly or implicitly, based on commanded turn radius. At the block 506, for example, the process 500 can include a computing device determining a current operator-commanded turn radius (e.g., based on the received operator input from block 503). In some cases, this can include a computing device actively determining a commanded turn radius that is according to the received operator input. For example, a computing device can decompose the operator input into a driving component (e.g., indicative of the speed at which the power machine is to travel) and a rotational travel component (e.g., indicative of the turn radius at which the power machine is to turn). In some cases, a computing device can determine the rotational travel component by determining the operator commanded speed differential between a first actuator and a second actuator. In some embodiments, this can include a computing device determining the commanded turn radius, based on the orientation of the joystick. For example, an angle of the joystick (e.g., relative to a neutral position) can indicate the operator-commanded turn radius for the power machine.

Generally, the process 500 can sometimes include determining, based on a selected ground-engagement mode, whether to modify an operator-provided drive command to provide a command for movement of one or more actuators. For example, for a given ground-engagement mode, some operator inputs may correspond to commands for movement that do not require modification before being implemented at one or more actuators (e.g., commands that would not be smaller than a minimum turn radius or that would otherwise satisfy operational parameters of the selected mode relative to rotational capabilities of the power machine). Similarly, for example, some ground-engagement modes may correspond to zero modification of operator-commanded movements in some or all circumstances.

At block 508, the process 500 can include a computing device determining whether or not the operator-commanded turn radius is below a minimum allowable turn radius that corresponds to the selected ground-engagement mode from block 502, as determined at block 504. If at the block 508 the computing device determines that the operator-commanded turn radius is above the minimum allowable turn radius, then the process 500 can proceed to the block 510. Alternatively, if at the block 508, the computing device determines that the operator-commanded turn radius is not below the minimum allowable turn radius, then the commanded drive operation corresponding to the received operator input can be implemented without modification (e.g., by a separate process (not shown)), and the process 500 can proceed back to the block 503 to receive additional operator input, etc.

In some configurations, the process 500 need not include a computing device actively determining an operator-commanded turn radius for comparison to a threshold radius to appropriately adjust movement of the (entire) power machine via the modified drive commands provided at block 510. For example, as also described above, a computing device can modify a drive command corresponding to an operator input without express reference to turn radius, but so that the power machine is effectively commanded to turn at a larger radius than an operator-commanded turn radius. For example, a computing device can modify part or all of a drive command according to a look-up table.

Figure 8:
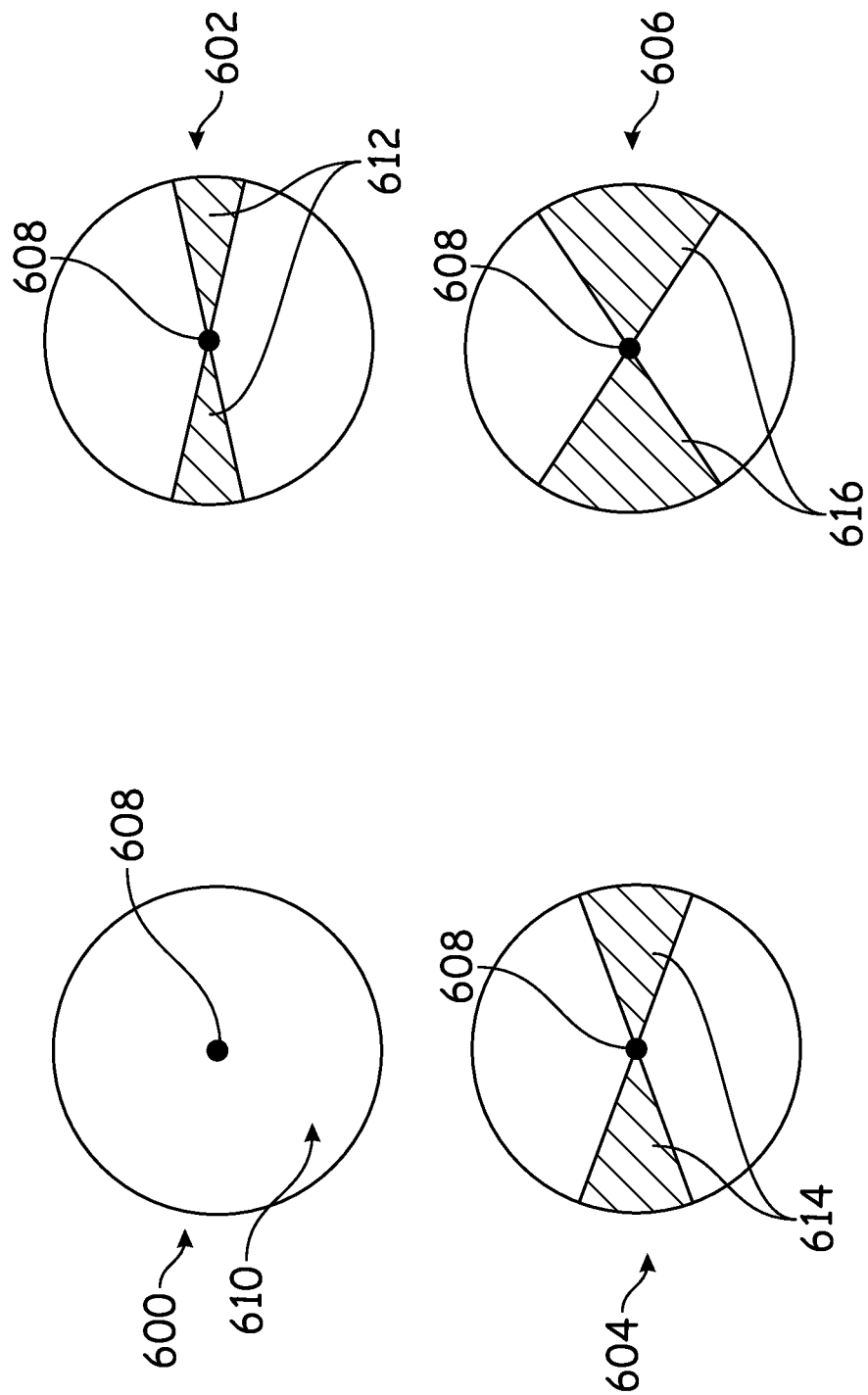
FIG. 8 is a schematic illustration of different configurations of movement regions for travel commands, as can be implemented for a joystick.

In some embodiments, modifying a drive command for steering operations can proceed based on a geometrical mapping of possible input positions of an input device to particular ground-engagement modes or to one or more particular parameters (e.g., scaling factors) of a particular ground-engagement mode. In this regard, for example, FIG. 8 shows a schematic illustration of different joystick configurations 600, 602, 604, 606, corresponding to different respective ground-engagement modes. In particular, and as further discussed below, in which the joystick configurations 602, 604, 606 each have a different restricted region (e.g., among other differences).

Although each of the joystick configurations 600, 602, 604, 606 are different, each of the joystick configurations 600, 602, 604, 606 can be implemented by the same joystick in some cases (e.g., as corresponds to the currently selected ground-engagement mode). Correspondingly, a computing device (e.g., the control device 408) can change between the different joystick configurations 600, 602, 604, 606 to determine how to process received operator inputs to provide modified drive commands.

In some cases, a restricted region for a particular input device can correspond to operator inputs under the process 500 for which no turning operations are permitted (e.g., only straight travel) or for which various other restrictions (e.g., no travel at all) may be implemented. In the example shown in FIG. 8, for the joystick configuration 600, there are no restricted regions and all of the possible movement locations of the joystick 608 correspond to unmodified commanded movement to the one or more actuators. Correspondingly, no special limits may be applied relative to turn radius for steering operations, counterrotation of opposing tractive elements, etc. In contrast, the joystick configurations 602, 604, 606 each have a respective restricted region 612, 614, 616, such that when the joystick 608 is positioned within one of the restricted regions 612, 614, 616 a modified steering command does not permit turning operations (e.g., only permits straight travel). In the illustrated example, the restricted regions are geometric sectors and no turning operations are permitted for operator inputs falling within the restricted regions. However, in other example, restricted regions may exhibit different shapes, or may correspond to differently modified drive commands.

As one example, the joystick configuration 600 can correspond to operation of a power machine in which movement of the joystick in any direction can command movement of the power machine, and the power machine may be capable of unrestricted counter-rotation (at least relative to modification of steering commands based on joystick position as similarly discussed for the configurations 602, 604, 606n). As another example, the joystick configuration 602 can filter out straight joystick movements to either lateral side (e.g., can filter out joystick movements that are within 10 degrees of purely lateral). Accordingly, the power machine may not turn when the joystick is in the restricted region 614, and a non-zero minimum turning radius can be enforced (e.g., a turning radius of at least 3 feet). As still another example, the joystick configuration 604 can filter out lateral joystick movements similarly to the joystick configuration 602, but with an expanded filter range (e.g., filtering out joystick movements that are within 18 degrees of purely lateral, or that are otherwise within a range that is larger than that of the configuration 602). Accordingly, the power machine may not turn when the joystick is in the restricted region 614, and a larger non-zero minimum turning radius can be enforced (e.g., a turning radius of at least 10 feet). Finally, as yet another example, the joystick configuration 606 can filter out lateral joystick movements similarly to the joystick configurations 602, 604, but with a still more expanded filter range (e.g., filtering out joystick movements that are within 25 degrees of purely lateral, or that are otherwise within a range that is larger than that of the configuration 604). Accordingly, the power machine may not turn when the joystick is in the restricted region 616, and an even larger non-zero minimum turning radius can be enforced (e.g., a turning radius of at least 20 feet).

In some embodiments, aspects of the invention, including computerized implementations of methods according to the invention, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the invention can be implemented as a set of instructions, tangibly embodied on a non-transitory computer-readable media, such that a processor device can implement the instructions based upon reading the instructions from the computer-readable media. Some embodiments of the invention can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the invention, or of systems executing those methods, may be represented schematically in the FIGs. or otherwise discussed herein. Unless otherwise specified or limited, representation in the FIGs. of particular operations in particular spatial order may not necessarily require those operations to be executed in a particular sequence corresponding to the particular spatial order. Correspondingly, certain operations represented in the FIGs., or otherwise disclosed herein, can be executed in different orders than are expressly illustrated or described, as appropriate for particular embodiments of the invention. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g. "one or the other but not both") when preceded by terms of exclusivity, such as "either," "one of," "only one of," or "exactly one of."

Although the present invention has been described by referring preferred embodiments, workers skilled in the art will recognize that changes may be made in form and detail without departing from the scope of the discussion.

What is claimed is:

1. A power machine comprising:
   a main frame;
   drive actuators including a first drive actuator and a second drive actuator, the first and second drive actuators configured to actuate independently of each other to provide skid-steer steering;
   an operator input device configured as a joystick that receives operator inputs along a first axis and a second axis to control movement of the drive actuators during travel of the power machine; and a control device in communication with the drive actuators and the operator input device, the control device being configured to:
    select a ground-engagement mode from a plurality of ground-engagement modes, each of the plurality of ground-engagement modes defining a respective turn profile for the power machine;
    receive, from the operator input device, an operator input corresponding to an operator command for movement of one or more of the drive actuators to provide travel with an operator-commanded movement;
    determine a drive command to control movement of at least one of the drive actuators based on the selected ground-engagement mode and the operator input; and
    provide the drive command according to the selected ground-engagement mode to move the at least one of the drive actuators.

2. The power machine of claim 1, wherein the determined drive command commands no movement of one or more of the at least one drive actuators for which movement is commanded by the operator input.

3. The power machine of claim 1, wherein determining the drive command includes determining a modified drive command for the least one drive actuators based on an operator-commanded turn radius of the operator-commanded movement being smaller than a minimum allowable turn radius of the selected ground-engagement mode.

4. The power machine of claim 1, wherein the operator input is received along the first axis and the second axis to define a rotational travel component and a forward/reverse drive component; and
    wherein the control device is configured to provide the drive command as a modified drive command, including by:
        modifying the operator input to generate a modified operator input, the modified operator input including a modified rotational travel component; and
        transmitting the modified operator input to command movement of the at least one drive actuators according to the modified operator input.

5. The power machine of claim 4, wherein the modified rotational travel component is reduced relative to the rotational travel component.

6. The power machine of claim 4 wherein the control device is configured to modify the operator input to:
    for a first ground-engagement mode, command the movement of at least one of the drive actuators to restrict the rotational capability of the power machine to a first threshold;
    for a second ground-engagement mode, command the movement of the at least one of the drive actuators to restrict the rotational capability of the power machine to a second threshold, that is less restrictive than the first threshold; and
    for a third ground-engagement mode, command the movement of the at least one of the drive actuators to restrict the rotational capability of the power machine to a third threshold, that is less restrictive than the second threshold.

7. The power machine of claim 5, wherein the control device is configured to reduce the rotational travel component in inverse proportion to a magnitude of the forward/reverse drive component.

8. The power machine of claim 1, wherein the operator input commands counter-rotational movement of the first and second drive actuators; and
    wherein the provided drive command commands movement of the first drive actuator and the second drive actuator in the same rotational direction.

9. The power machine of claim 4, wherein the joystick is movable to a plurality of movement regions to command movement of the power machine, including a restricted region; and
    wherein the control device is configured to determine the modified drive command based on the operator input corresponding to the joystick being positioned within the restricted region.

10. The power machine of claim 9, wherein the modified drive command prevents or limits turning based on the operator input corresponding to the joystick being positioned within the restricted region.

11. The power machine of claim 1, wherein the control device is further configured to:
    determine, based on the selected ground-engagement mode, whether to modify the operator command to determine the drive command; and
    based on the control device determining to modify the operator command, modifying the operator command based on the selected ground-engagement mode, to determine the drive command; and
    wherein, for a given operator command, operating under a first ground-engagement mode results in a first modification of the operator command to determine the drive command and operating under a second ground-engagement mode results in a second modification of the operator command different from the first modification.

12. The power machine of claim 11, wherein the first modification includes zero modification for at least one non-zero operator command.

13. A method of controlling a power machine, the method comprising:
    selecting, using an electronic control device, a ground-engagement mode from a plurality of ground-engagement modes, for a power machine that includes a main frame, drive actuators including a first drive actuator and a second drive actuator, and an operator input device configured as a joystick;
    receiving from the operator input device at the electronic control device, an operator input that includes inputs along a first axis and a second axis and indicates a drive command for movement of one or more of the drive actuators, to provide travel with an operator-commanded turn radius; and
    modifying the drive command to the one or more drive actuators according to the selected ground-engagement mode to command the drive actuators for travel with a turn radius that is different from or the same as the operator-commanded turn radius.

14. The method of claim 13, wherein the turn radius is larger than the operator-commanded turn radius.

15. The method of claim 13, wherein the drive command includes a commanded rotational travel component and a commanded linear travel component; and
    wherein modifying the drive command includes determining a modified rotational travel component that is scaled relative to the commanded rotational travel component based on a magnitude of the commanded linear travel component.

16. The method of claim 13, wherein the joystick is movable within an area that includes a restricted region; and wherein the modified drive command is determined based on the operator input corresponding to the joystick being positioned within the restricted region.

17. The method of claim 16, wherein the operator input commands non-zero movement of the one or more drive actuators,
wherein the modified drive command corresponding to the operator input causes zero movement of the one or more drive actuators, and
wherein the restricted region includes a sector that extends laterally from a neutral position of the joystick.

18. The method of claim 13, wherein the modified drive command includes a zero-movement command for at least one of the one or more drive actuators that is commanded to move by the operator input.

19. The method of claim 13, wherein the operator input commands travel with an operator-commanded turn radius and an operator-commanded acceleration; and
wherein the modified drive command commands travel of the power machine with the operator-commanded turn radius and a reduced acceleration relative to the operator-commanded acceleration.

20. The method of claim 13, wherein the operator input is an H-pattern input; and
wherein determining the modified drive command includes converting the H-pattern input to linear and rotational travel components of an ISO-pattern command and modifying the rotational and travel components of the ISO-pattern command.

21. The method of claim 13, wherein, in a first ground-engagement mode, for any operator input of a set of possible operator inputs at an input device, the modified drive command commands movement of a first drive actuator and a second drive actuator only so that one or more of:
the first and second drive actuators rotate in the same direction; or
the first and second drive actuators do not rotate.

22. The method of claim 13, wherein the power machine includes a lift arm coupled to the main frame, and a work element supported by the lift arm.

23. A power machine comprising:
a main frame;
drive actuators including a first drive actuator and a second drive actuator, the first and second drive actuators configured to provide skid-steer drive for the power machine;
an operator input device configured to be positioned within a plurality of available movement regions to command non-zero movement of the drive actuators, the movement regions including a restricted region; and
a control device in communication with the drive actuators and the operator input device, the control device being configured to:
select a ground-engagement mode from a plurality of ground-engagement modes, each ground-engaging mode of the plurality of ground-engagement modes defining respective turning parameter for the power machine;
based on movement of the operator input device, receive an operator input that commands an operator-commanded movement of one or more of the drive actuators for operator-commanded turning travel of the power machine; and
in response to the operator input corresponding to the operator input device being positioned within the restricted region, command a modified movement of the one or more drive actuators to provide modified turning travel of the power machine that is different than the operator-commanded turning travel.

24. The power machine of claim 23, wherein the operator-commanded turning travel corresponds to non-zero rotation of at least one of the drive actuators; and
wherein the control device is further configured to:
when the operator input corresponds to the operator input device being positioned within the restricted region, command zero rotation of the at least one drive actuator.

25. The power machine of claim 23, wherein the operator input devices is configured as a joystick movable along a first axis to provide a first-axis input and along a second axis to provide a second-axis input.

* * * * *